C. B. HOOK.
CULTIVATOR FENDER.
APPLICATION FILED APR. 2, 1919.
1,328,518.
Patented Jan. 20, 1920.
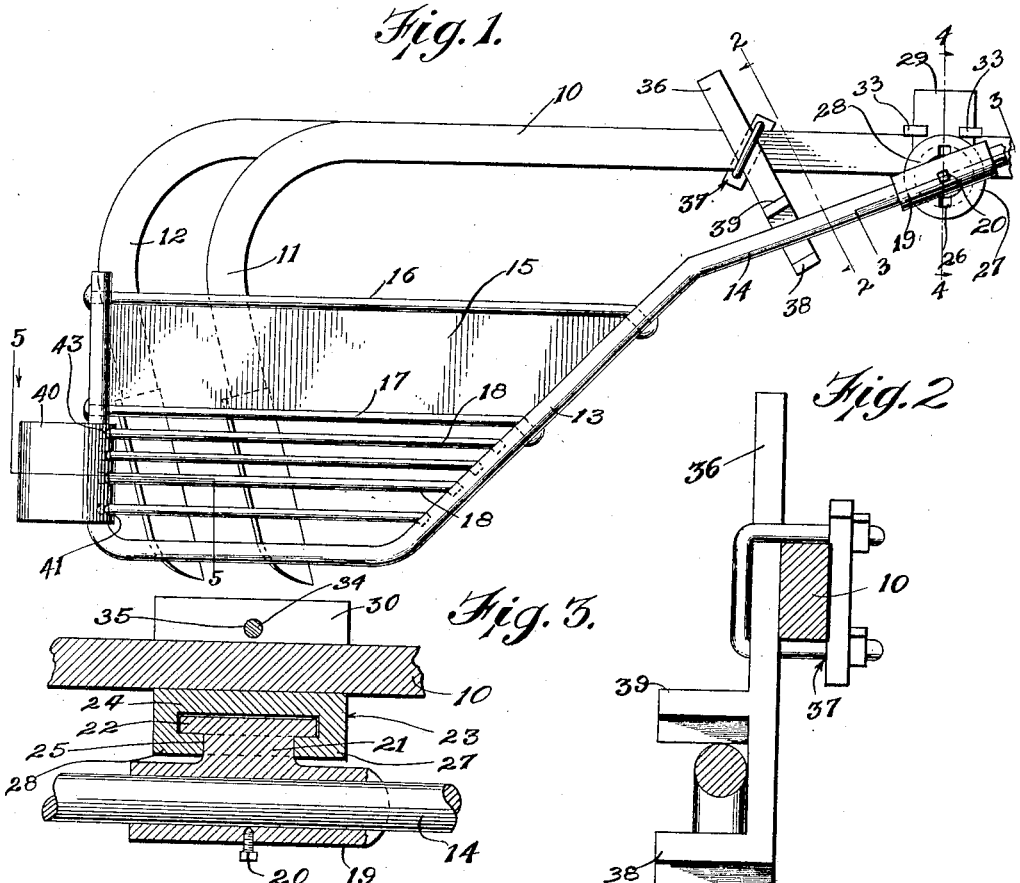
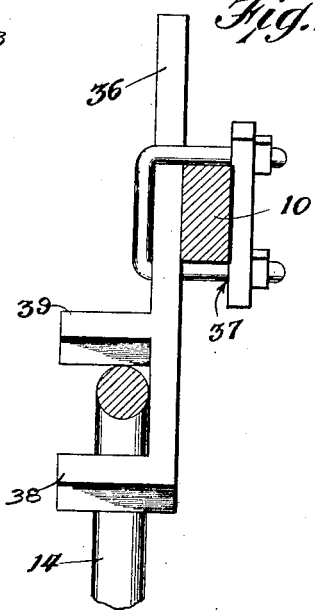
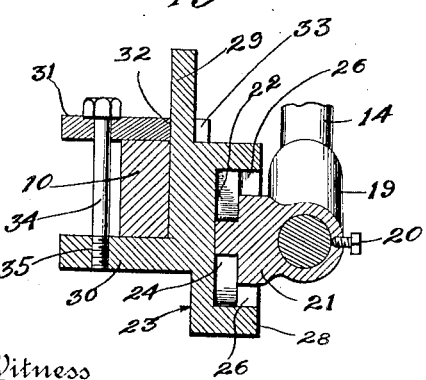
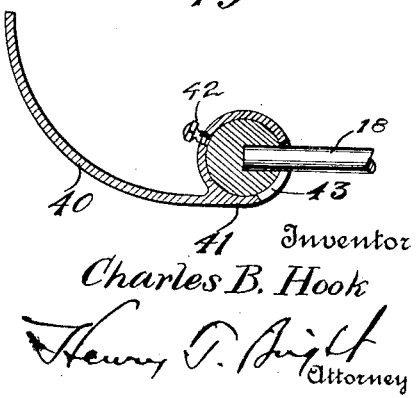
Inventor
Charles B. Hook

UNITED STATES PATENT OFFICE.

CHARLES B. HOOK, OF MUNCIE, INDIANA.

CULTIVATOR-FENDER.

1,328,518.   Specification of Letters Patent.   Patented Jan. 20, 1920.

Application filed April 2, 1919. Serial No. 286,879.

*To all whom it may concern:*

Be it known that I, CHARLES B. HOOK, a citizen of the United States, residing at Muncie, in the county of Delaware, State of Indiana, have invented certain new and useful Improvements in Cultivator-Fenders, of which the following is a specification.

My invention relates to cultivator fenders and broadly speaking has for its purpose the provision of a fender of this type which can be readily associated with any cultivator and which will effectively prevent large clods of earth or stones from being thrown upon plants when plowing between rows, while at the same time permitting finely divided earth to pass therethrough and be deposited around the plants.

Furthermore, it is my purpose to provide improved means for attaching the fender to the cultivator which will permit of limited pivotal movement thereof in a substantially vertical plane in respect to variations in the contour of the ground with which the lower edge of the fender may be engaged during cultivation.

It is also my purpose to provide a cultivator fender embodying an adjustable clod guard located at the rear thereof and serving to throw away from the plant rows such clods as may be raised against the fender and temporarily supported by the latter in its passage.

With the above and other purposes in view the invention consists in the details of constructions and in the arrangement and combination of parts to be hereinafter more fully described and particularly pointed out in the claims.

In describing the invention in detail reference will be had to the accompanying drawing wherein like characters of reference denote corresponding parts in the several views and in which—

Figure 1 is a side elevation of a fragment of a cultivator showing my improved fender applied;

Fig. 2, an enlarged section on the line 2—2 of Fig. 1;

Fig. 3, an enlarged section on the line 3—3 of Fig. 1;

Fig. 4, an enlarged section on the line 4—4 of Fig. 1; and

Fig. 5, an enlarged section on the line 5—5 of Fig. 1.

Referring to the drawings 10 indicates the cultivator beam with which is associated standards 11 and 12. My improved cultivator fender is shown as comprising a substantially spoon-shaped frame including a bowl portion 13 and a stem portion 14. The upper part of the bowl portion is closed by a sheet metal slab 15 supported at its top and bottom by rods 16 and 17 respectively, said rods 16 and 17 being anchored to the side portions of the bowl 13. Disposed beneath the rod 17 and supported between the side portions of the bowl 13 are spaced rods 18, the distance between said rods 18 being such as will permit the passage of finely divided earth therebetween, but will prevent the passage of clods and stones. The stem portion 14 is slidably engaged in a tubular member 19 and is maintained in a desired adjustment with respect to said tubular member by a set screw 20. This tubular member 19 is provided centrally with a lateral extension 21 and said extension is provided with oppositely disposed locking lugs 22 for a purpose that will presently appear. To rotatably secure the member 19 to the beam 10 I provide a casting 23 having a hollow body portion 24. The interior chamber of this body portion 24 opens through the side of the casting 23 adjacent the member 19 through the medium of a reduced passage 25 having run out portions 26, said reduced passage forming flanges 27 and 28. The diameter of the passage 25 is such that it will snugly receive the extension 21 on the member 19, the lugs 22 passing through the run outs 26 to the plane of the major interior of the body 24 and in this manner a rotative connection is established between the casting 23 and the member 19. It will be observed that the run outs 26 are disposed vertically and in line with each other so that when the member 19 is rotated to operative position to properly dispose the fender the lugs 22 will pass behind the flanges 27 and 28 and thus rotatably connect the fender to the casting. In order to conveniently secure the casting 23 to the beam 10 I provide the body 24 with vertical and horizontal extensions 29 and 30 respectively, the latter passing beneath the beam 10 as is clearly shown in Fig. 4. The extension 29 is interlocked with a securing plate 31 disposed against the upper side of the beam 10 and having a recess 32 receiving the extension 29 and securing flanges 33 which extend partly across the outer face of said extension. A locking screw 34 is passed through an opening in the plate 31 and engaged with an alined threaded opening 35 in the extension 30. By the operation of this screw it will be apparent that the casting 23 can be easily secured to and detached from the beam 10.

In order to regulate the amount of pivotal movement of the fender during operation in response to varying contour of the ground I provide a stop member which consists of a bar 36 secured to one end of the beam 10 by a clip 37. This bar is provided with spaced stop lugs 38 and 39 between which the stem 14 extends. The distance between these lugs 38 and 39 determines the pivotal movement of the fender as will be apparent.

My improved clod guard comprises a curved plate 40 with which is associated a tubular portion 41 rotatably engaged on the rear side of the bowl portion of the fender frame and held in a desired adjustment by a set screw 42. This tubular portion 41 is provided with a plurality of lateral passages 43 in which are disposed respective rods 18. These passages 43 are sufficiently extensive to permit the necessary rotative adjustment of the clod guard before the side walls of the passages are engaged by the related rod 18. The curvature of the plate 40 is such that it is directed inwardly or toward the standards 11 and 12 and by reason of this curvature the throwing back of the large clods and stones into the furrow as the fender moves along is assured.

I claim:—

1. The combination with a cultivator beam, of a hollow casting the interior chamber of which opens through one side of the casting, a tubular member having a lateral extension held in the interior chamber for free rotation at all times, and a fender including a stem portion adjustably mounted in the tubular member.

2. The combination with a cultivator beam, of a hollow casting secured to said beam, the interior chamber of the casting having a reduced portion opening through one side of the casting and forming a holding flange, oppositely disposed run-out recesses formed in said flange, a tubular member having a lateral extension rotatable in the reduced portion of the interior chamber of the casting, securing lugs on said extension engageable through the run-out recesses and movable to a position behind the securing flange of the casting to maintain the tubular member in rotative relation to the casting, and a fender including a stem portion adjustably mounted in the tubular member.

3. The combination of a cultivator fender, and a clod guard adjustably mounted on the rear of the fender for movement in a plane transverse the plane of said fender.

4. The combination of a cultivator fender including a substantially spoon-shape frame, a clod guard rotatably mounted on the rear side of the bowl portion of the frame, and means for locking said guard in a desired adjustment with respect to the fender.

In testimony whereof, I affix my signature in the presence of two witnesses.

CHARLES B. HOOK.

Witnesses:
DAWSON H. THOMPSON,
CLARENCE W. DEARTH.